United States Patent [19]
Svehaug

[11] Patent Number: 5,426,891
[45] Date of Patent: Jun. 27, 1995

[54] DOOR KNOCKER WITH INVISIBLE LENTICULAR BREAST PLATE

[76] Inventor: Oswald C. Svehaug, 1010 San Ysidro Ave., San Ysidro, Calif. 92173

[21] Appl. No.: 222,222

[22] Filed: Apr. 4, 1994

[51] Int. Cl.⁶ .............................................. E06B 7/28
[52] U.S. Cl. ...................................... 49/171; 359/511; 359/618; 359/894; D8/401
[58] Field of Search .................. 49/169, 171; 359/511, 359/618, 894; D8/401, 402

[56] References Cited

U.S. PATENT DOCUMENTS

| | | | |
|---|---|---|---|
| D. 159,455 | 7/1950 | Waltman | D8/401 |
| D. 221,130 | 7/1971 | Gewertz | D8/401 |
| D. 256,093 | 7/1980 | Kuppermann et al. | D8/401 |
| 2,581,234 | 1/1952 | Bloom | 49/171 X |
| 4,415,235 | 11/1983 | Coates | 359/894 X |
| 4,719,720 | 1/1988 | Olsen | 49/171 |
| 4,763,444 | 8/1988 | Ritchie | 49/171 |

*Primary Examiner*—Peter M. Cuomo
*Assistant Examiner*—Jerry Redman
*Attorney, Agent, or Firm*—Ralph S. Branscomb

[57] ABSTRACT

A combined door knocker and viewer utilizes the from portion of the central breast plate area of the body of a door knocker as the forwardmost element of a lens system, permitting the viewer wide angle viewing of the area forward of the door undetected by the caller, who has no reason to suspect that the breast plate of the knocker coat-of-arms is also the front lens of a viewer.

13 Claims, 1 Drawing Sheet

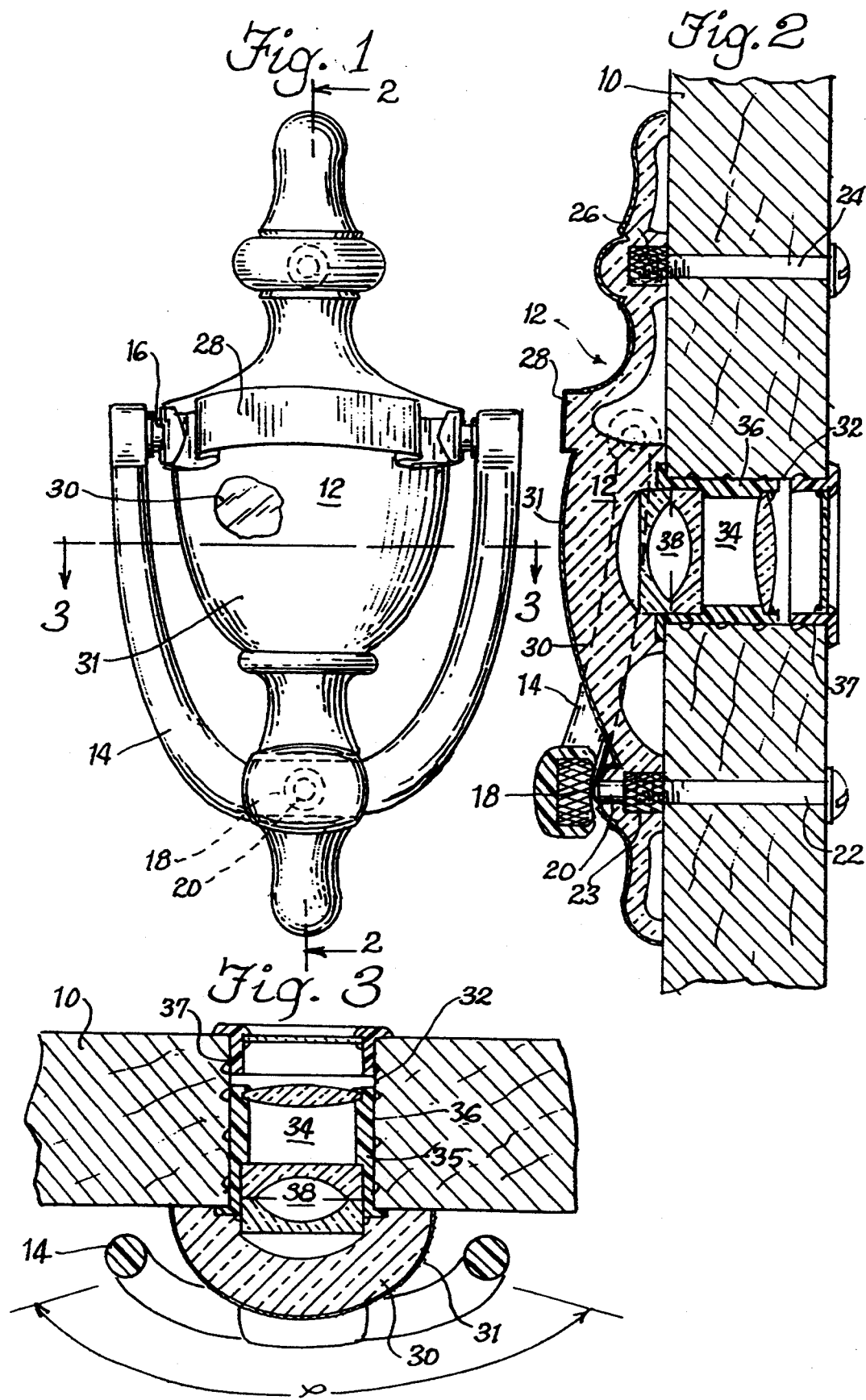

DOOR KNOCKER WITH INVISIBLE LENTICULAR BREAST PLATE

BACKGROUND OF THE INVENTION

Door knockers and "peep-holes" are popular, especially among urbanites, and the combination of a door knocker and a viewer in a single unit is not new. Representative samples of such can be seen in the following patents, some of which incorporate audio communication in addition to the knocker/viewer.

U.S. Pat. Des. No. 113,884, issued Mar. 21, 1939, for a DOOR KNOCKER;

U.S. Pat. Des. No. 221,130, issued Jul. 13, 1971, for a DOOR MOUNTED PROTECTION UNIT;

U.S. Pat. Des. No. 159,455, issued Jul. 25, 1950, for a DOOR KNOCKER;

U.S. Pat. No. 1,349,731, issued on Aug. 17, 1920, on a COMBINED MAIL OPENING AND DOOR KNOCKER;

U.S. Pat. No. 4,763,444, issued Aug. 15, 1988, for a VIEWING AND ORAL COMMUNICATIONS ASSEMBLY FOR DOORS;

U.S. Pat. No. 1,901,303, issued Mar. 14, 1933, for a ATTACHMENT FOR DOORS; and,

U.S. Pat. No. 2,078,002, issued Jul. 23, 1936, also an ATTACHMENT FOR DOORS.

These units all combine at least two communication functions, such as a knocker and viewer, in a single door-mounted unit.

However, they also share a common drawback in that none effectively disguises the fact that a viewer is incorporated in the structure of the device. Although the caller on the outside of the door may not be able to see through and cannot determine the identity of those inside, or how many people there are, it becomes obvious that someone is home when the viewer is blocked by the shadow of the resident. The normally visible pinhole of light suddenly disappears, as is especially apparent at night.

There are instances when the resident does not wish the person outside to know if anyone is home. Whether it be a pesky neighbor or unpleasant inlaw, or a burglar disguised as a delivery man casing the place, there are many times when the resident might just want to "play possum", preserving his solitude without offending friends and relatives or tipping off felons.

In addition to avoiding callers, some people to are embarrassed to use peepholes and it may be embarrassing to the people that call as well. The peephole makes it clear that the resident does not trust all callers, and there is a natural inclination of the present caller to feel that he is being identified with the group of callers who cannot be entirely trusted.

In the best of all worlds the viewer would be invisible, or combined with another structure and disguised, such that the caller has no way of knowing of its existence.

SUMMARY OF THE INVENTION

The instant invention conforms to the above-stated utopian ideal by providing a viewer which is carefully integrated into the structure of a coat-of-arms style door knocker. The central portion of the knocker body which comprises the breast plate area is transparent and externally silvered along with the rest of the body so that not enough light escapes from inside the dwelling through the viewer to be visible from outside. There is no external structure on the knocker which would suggest that there is a viewer to the rear of it and that the knocker is in fact itself a part of the viewer structure both physically and functionally.

On the inside of the door, if some means is used to cover the peephole, such as a plug or a small painting, once inside the caller will never be tipped off that he was being observed prior to entry.

BRIEF DESCRIPTION OF THE DRAWINGS

FIG. 1 is a front elevation view of the knocker/peephole combination as it would appear mounted on a door;

FIG. 2 is a section taken along lines 2—2 of FIG. 1 illustrating the lens configuration of the viewer as it integrates with the frontmost lens defined by the breast plate of the knocker; and, FIG. 3 is a section taken along line 3—3 of FIG. 1.

DETAILED DESCRIPTION OF THE PREFERRED EMBODIMENT

As shown in FIG. 2, the knocker mounts to a door indicated all 10 which would ordinarily be wood, the actual construction not being material to the invention, as the knocker can be installed on any door. The knocker is made of a body 12, and a pivotally mounted knocker yoke 14 has ends which are loosely journalled in sockets defined in the shoulder area of the body at 16. The position of the yoke is such that a caller using the knocker is highly visible through the viewer. Both of these parts are preferably molded plastic and snapped together to form a single unit: the knocker body and its pivotal yoke clapper.

At the bottom of the yoke is a metallic mass or other weight 18 which is used as a moving percussion element or clapper to impact a static percussion element 20 in the body so that when the two collide a loud knock is produced. A plastic-on-plastic collision does not make a loud enough sound to be heard throughout a dwelling. The moving weight 18 is either pressed into a socket defined in the lower portion of the yoke or it may be molded integrally during the forming process of the molded body.

The moving element is aligned with the static element 20 as indicated above, with this second element being preferably the front end, or mounted on the front end, of a screw or bolt 22 which passes through, or at least passes into, the door to mount the unit. The bolt is retained by a nut 23, press-fitted or molded into the body. In addition to doubling the function of the bolt, making it a knocker element as well as a mounting fastener, this configuration also has the advantage of transmitting the shock waves from the two colliding percussion elements into the body of the door, which reverberates as a sounding board with a noise that can be heard throughout the building.

The upper portion of the body may be mounted in a similar fashion, such as with a bolt 24, which threads into a nut 26 molded integrally with the body of the knocker. The bolt could be replaced with a screw so that no bolt head is visible inside the door, or the nut could be replaced by the molded structure of the body itself and the screw or bolt threaded directly into the body. But for a long-lasting, permanent fixture an ordinary nut-and-bolt mount will last indefinitely in the face of normal daily use, contrasted with the gradual wearing that occurs when plastic engages steel threads.

The knocker used to illustrate the principal of the invention is shaped to resemble a coat-of-arms, and a name banner 28 carries this theme forward by displaying the family name. Beneath the banner is the breast plate region 30. This is the region which is an inherent lens and is used as the forwardmost lens of the optical system. The lenticular shape of this :part of the body lies on the optical axis of the lens array and is coordinated with the other lenses to achieve an imageable light path immediately behind the peephole.

The surface 31 of the breastplate region 30 of the body is treated to be highly reflective. In the preferred embodiment, the entire surface of the body is uniformly subjected to a metalicizing vacuum process which is shown in hyperbole in FIG. 2 for visual clarity. This leaves the surface with a shiny metallic luster indicated on the surface 31 in FIG. 1, impossible to distinguish from metal, which permits substantially no light to escape in a forward direction. The entire body then would appear to be a metallic coat of arms, complete in and of itself without exhibiting any obvious need for a supplemental raison d'être, and not revealing its function as the operative element of an unrelated surveillance device.

Unknown to the caller, the body of the knocker is transparent, at least in the breastplate area, and behind it lies a bored passage 32 which mounts a lens array 34 in a cylindrical housing 36. The lens array may be provided in two separate parts 36 and 37 as shown to accommodate doors of different thicknesses. The interior lens configuration of the lens cylinder is not part of the invention, although it is essential to the operation of the unit. An "air lens" such as lens 38, defined by two face-to-face plano-concave lenses is positioned immediately adjacent the front of the door. This achieves the needed fish-eye lens effect, sweeping a wide arc in from of the door.

The lenticular area, or breast area 30, of the body acts in conjunction with the air lens and other lenses to achieve maximum sweep possible without sweeping backwards, and providing a beam having a focal plane capable of forming an image in the eye on the inside of the door. The air lens and the lens inherent in the breast plate area 30 together replace a single fisheye lens used in a conventional peephole. By positioning the forwardmost optical element actually forward of the front surface of the door 40, an even wider range can be viewed than with the traditional unit mounted in the door, which is limited to at most 180°.

Although a coat of arms is used in the illustrations description, it is exemplary only. Any knocker configuration with a generally lenticular region integrated into the visual theme of the front of the unit and acting as the front of a lens assembly would be adequate.

To install the device, a bore 32 is made in the door and the lens array 34, provided as two subsets 36 & 37, is pressed into place from opposite sides of the door into the bore as illustrated. Then the knocker is slipped over the front end of the lens array as shown in FIGS. 2 and 3, and when properly aligned the location of the holes for the bolts at the top and bottom of the unit would be marked and drilled, and the unit mounted in its final position as shown in the drawings.

The unit is ideal for those who not only are fearful of criminal "scouts" and care to enjoy their privacy without offending callers, but also for timid souls who feel embarrassed about having a "peep-hole" in the first place. Being invisible to callers, it can be owned and used with impunity and total confidence.

It is hereby claimed:

1. A combined door knocker and invisible viewer comprising:
    (a) a knocker having:
        (i) a knocker body mountable on an entryway door and defining a lower portion;
        (ii) a hanging yoke pivotally mounted on a said body with a horizontal axis when said body is mounted on a door and having a depending resting position in which a lower portion of said yoke is defined;
        (iii) a static percussion element defined in the lower portion of said knocker body and substantially aligned with the lower portion of said yoke when said yoke is in said depending resting position;
        (iv) a gravity-operated moving percussion element mounted in the lower portion of said yoke for impacting said static percussion element when said yoke is released from an upper position to fall into said resting position;
        (v) said body defining a lenticular region having a front and a rear and defining a frontally visible visual theme incorporating the front of said lenticular region;
        (vi) said lenticular region having at least one surface restrictive to passage of visible light forwardly therethrough yet being substantially transparent to visible spectrum radiation passing therethrough in the rearward direction; and,
    (b) a linear optical lens array for positioning in a door behind said lenticular region, with an optical axis passing through said lenticular region when positioned in said door, and the focal lengths of lenses in said lens array being such that an image is formable by a human eye positioned to the rear of said body, from light passing through said lenticular region from the front and through said optical array, said array being mountable in a door and behind said knocker body for enabling residents to view callers through said lenticular region permitting the identification of callers without the knowledge by the callers that there is a viewer behind the door knocker.

2. Combined door knocker assembly according to claim 1 wherein said body is polycarbonate and said lenticular region has a treated surface which is metalized to form a reflective metallic surface.

3. Structure according to claim 2 wherein substantially the entire body of said knocker is vacuum-metalized to present a monolithic reflective facade to the caller.

4. Structure according to claim 1 wherein said yoke straddles said lenticular region and assists in insuring that the caller is substantially within the viewing area of a resident at least when using the knocker.

5. Structure according to claim 1 wherein static percussion element has an extension protruding into the door to which said knocker is mounted to use said door as a sounding board.

6. Structure according to claim 5 wherein said static percussion element is defined by the forward end of a fastener which mounts said body to a door.

7. Structure according to claim 5 wherein said extension is a bolt which mounts said knocker to a door and said static percussion element is mounted on the forward end of said bolt.

8. Structure according to claim 1 wherein said lenticular region defines an inherent lens comprising a forward extension of said linear optical lens array.

9. Structure according to claim 8 wherein said inherent lens and said linear array together define a combination of lens which cooperate optically to provide a resident using said viewer from the rear of a door having a rear, to which door said combination is mounted, a substantially 180° view by virtue of the forwardmost lens of the lens combination being unitary with said body and spaced forwardly of the door.

10. Structure according to claim 1 wherein said body is a single molded unit fabricated of transparent plastic having a metalized surface.

11. Structure according to claim 10 wherein said yoke is U-shaped defining a rearwardly open central bored socket and said moving percussion element is mounted in said bored socket.

12. Structure according to claim 11 wherein said body has a bore therein in alignment with said moving percussion element in resting position when mounted on a door and including a bolt inserted through said bore and engaging said body to mount same to said door and also to contact said moving percussion element as said yoke is dropped from an upper orientation into its resting orientation.

13. Structure according to claim 1 wherein said lenticular region has a front surface and said frontally visible visual theme is a coat-of-arms having a breast plate defined by said front surface of said lenticular region.

* * * * *